US006549894B1

(12) United States Patent
Simpson et al.

(10) Patent No.: US 6,549,894 B1
(45) Date of Patent: Apr. 15, 2003

(54) COMPUTERIZED DOCKETING SYSTEM FOR INTELLECTUAL PROPERTY LAW WITH AUTOMATIC DUE DATE ALERT

(75) Inventors: Robert P. Simpson, Williamsville, NY (US); Michael J. Simpson, Youngstown, NY (US); William S. Perrello, Lancaster, NY (US)

(73) Assignee: LegalStar, Inc., Williamsville, NY (US)

( * ) Notice: Subject to any disclaimer, the term of this patent is extended or adjusted under 35 U.S.C. 154(b) by 0 days.

(21) Appl. No.: 09/309,376

(22) Filed: May 7, 1999

(51) Int. Cl.[7] .............................................. G06F 17/30
(52) U.S. Cl. ...................... 707/1; 707/2; 707/3; 707/4; 707/5; 707/104.1; 707/526; 707/528
(58) Field of Search ........................ 707/1–5, 526–529, 707/104.1

(56) References Cited

U.S. PATENT DOCUMENTS

| | | | | |
|---|---|---|---|---|
| 5,165,012 A | * | 11/1992 | Crandall et al. ............ | 345/618 |
| 5,175,681 A | | 12/1992 | Iwai et al. .................. | 364/400 |
| 5,329,447 A | | 7/1994 | Leedom, Jr. ................ | 364/419 |
| 5,548,535 A | * | 8/1996 | Zvonar ........................ | 702/81 |
| 5,883,623 A | * | 3/1999 | Cseri ........................... | 345/335 |
| 6,052,709 A | * | 4/2000 | Paul ............................ | 709/202 |
| 6,058,380 A | * | 5/2000 | Anderson et al. ............ | 705/40 |
| 6,070,150 A | * | 5/2000 | Remington et al. .......... | 705/34 |
| 6,134,563 A | * | 10/2000 | Clancey et al. ............. | 707/503 |
| 6,144,963 A | * | 11/2000 | Tsuda .......................... | 707/10 |
| 6,182,078 B1 | * | 1/2001 | Whitmyer, Jr. .............. | 705/26 |
| 6,360,211 B1 | * | 3/2002 | Anderson et al. ............ | 705/30 |

FOREIGN PATENT DOCUMENTS

WO    WO 91/06054    *   5/1991    ........... G06F/15/00

OTHER PUBLICATIONS

Woodbridge, Richard C. and Gardon, Paul A., "Selecting an IP Docket Management System", Intellectual Property Today, p. 25, Omega Communications, Inc., Jan. 1999.

* cited by examiner

Primary Examiner—Greta Robinson
Assistant Examiner—Debbie M. Le
(74) Attorney, Agent, or Firm—Simpson & Simpson, PLLC

(57) ABSTRACT

A computerized docketing system for legal matters, comprising a database operatively arranged to store information related to the legal matters, including actions to be taken with respect to the legal matters, and due dates associated with the actions to be taken, an arithmetic logic unit operatively arranged to scan the database, compare each of the due dates with a reference date, and classify the due dates according to proximity of each of the due dates to the reference date, and, means for displaying different classifications of the due dates in different colors for the purpose of alerting a user of the system of matters requiring attention.

12 Claims, 14 Drawing Sheets

(14 of 14 Drawing Sheet(s) Filed in Color)

Microfiche Appendix Included
(7 Microfiche, 549 Pages)

MASTER DOCKET REPORT
LegalStar, Inc.
SBD = BOLD / Due = Italics / Reminder = Normal

| Date Due | Action | Matter No. | Client | Se |
|---|---|---|---|---|
| *02/23/1976* | *Sections 8 & 15 Declaration* | *77351* | *537* | *72* |
| 02/23/1977 | Sections 8 & 15 Declaration | 77351 | 537 | 72 |
| *01/22/1979* | *Sections 8 & 15 Declaration* | *77330* | *537* | *72* |
| 01/22/1980 | Sections 8 & 15 Declaration | 77330 | 537 | 72 |
| *12/12/1994* | *File renewal application* | *no ref* | *390* | *72* |
| *03/11/1996* | *File renewal application* | *6732* | *225* | *66* |
| *03/26/1996* | *Sections 8 & 15 Declaration* | *IP612* | *537* | *79* |
| 09/11/1996 | File renewal application | 6732 | 225 | 68 |

Figure 7

COMPUTERIZED DOCKETING SYSTEM FOR INTELLECTUAL PROPERTY LAW WITH AUTOMATIC DUE DATE ALERT

This patent contains a microfiche appendix containing 7 microfiche having 594 frames. The microfiche is intended to be a part of the written description pursuant to 35 U.S.C. 112.

BACKGROUND OF THE INVENTION

In 1997, the United States Patent and Trademark Office (USPTO) received 237,045 patent applications and 224,355 trademark applications. In the same year, the USPTO issued 122,977 patents and registered 112,509 trademarks. Also in 1997, the United States Copyright Office registered more than 600,000 copyrights. In general, the number of patent and trademark application filings has increased over time, and this trend is likely to continue. Although many copyright applications for registration are filed pro se, most patent and trademark applications are prepared, filed and prosecuted by attorneys, patent attorneys and patent agents.

Of the approximately 1,000,000 lawyers now practicing in the United States, fewer than 23,000 were registered to practice patent law before the United States Patent and Trademark Office (as of May, 1999). With technology advancing at a rapid pace, and so few attorneys available to prepare and prosecute the ever-increasing number of patent applications to protect the technology, it is no surprise that most patent and trademark attorneys (and patent agents), and their associated law firms and companies, are often responsible for handling a large number of cases.

In practicing intellectual property law, practitioners are confronted, in each case, with meeting a bewildering number of due dates, many of which are critical. These myriad due dates are prescribed by Title 15 of the United States Code (for trademark matters), Title 17 of the United States Code (for copyright matters), and Title 35 of the United States Code (for patent matters). Additional deadlines are imposed by the Code of Federal Regulations (e.g., Title 37 of the Code of Federal Regulations which applies to patent and trademark matters), the Federal Rules of Civil Procedure, and various published Court rules. Yet other deadlines are imposed by clients or by corporate business objectives.

Each patent or trademark application handled by an attorney requires the docketing and meeting of a plurality of deadlines. For example, a typical utility patent application may impose a dozen or more time deadlines on a practitioner over the course of its prosecution. While some due dates may merely be reminders to take some action, others are critical deadlines (i.e, prescribed by statute) and failure to timely act prior to these so-called "statutory bar dates" may result in the loss of valuable intellectual property rights or in a legal malpractice claim against the practitioner. As noted by one practitioner, "According to Anthony Greene of Herbert L. Jamison & Co., LLC., West Orange, N.J., the failure to properly docket the multiplicity of patent and trademark due dates in even a modest IP practice is one of the major sources of IP malpractice claims. It has been widely speculated that this area of malpractice will grow as larger general practice firms, without previous experience in patents and trademarks, enter the IP field." Richard C. Woodbridge and Paul A. Gardon, "Selecting an IP Docket Management System", Intellectual Property Today, p. 25, Omega Communications, Inc., January 1999.

Typical actions, which may be docketed and performed by a practitioner in evaluating an invention for patentability, preparing, filing and prosecuting a utility patent application, or in tracking actions anticipated to be taken by the Patent Office, are as follows:

Conduct novelty search on invention
Prepare patentability opinion
File patent application before one year statutory bar (sale, public use or publication)
Receive acknowledgment postcard from USPTO
Receive official filing receipt and foreign filing license
Send Rule 56 Duty of Disclosure letter to inventor(s)
File Information Disclosure Statement
Respond to First Office Action
Send foreign filing letter to client
Foreign file before deadline to receive priority filing date
Respond to Second Office Action
File Notice of Appeal
File Appeal Brief
File formal drawings
Pay Issue Fee
Pay Maintenance Fee(s)

A similar number of actions are tracked and docketed for trademark matters, and a lesser number of actions (i.e., renewals) are tracked for copyrights. Similar actions are also tracked for foreign matters (patent and trademark applications filed in foreign countries), and in inter partes proceedings (e.g., trademark oppositions and cancellation proceedings). It is clear, then, that even a relatively small law firm or company handling a portfolio of just a few hundred cases can easily be confronted with tracking and docketing tens of thousands of due dates for actions to be taken, either by the practitioner or the Patent Office. Large firms or companies may be faced with docketing more than a hundred thousand dues dates and actions.

In earlier times, patent and trademark attorneys relied on manual docketing systems which involved complicated manual ledger and/or tickler systems for tracking actions to be taken and deadlines to be met. These systems required constant attention and vigilance, highly trained docketing clerks and administrators, and direct supervision by attorneys. Often, the systems included redundancy to ensure that dates were not missed, which redundancy provided added protection at the expense of efficiency. Obviously, any manual system cannot be operated flawlessly. All humans make mistakes. Moreover, the opportunity for error increases as the number of files being maintained increases. Despite well-documented procedures, cross-checking and vigilance, all manual systems are susceptible to failure. They are especially problematic when employees leave, and new employees are forced to learn the system.

An obvious approach to solving the docketing problem is to use a computer to track pertinent dates and actions. Several companies now offer intellectual property (IP) docketing software products. These include Computer Packages, Inc. of Rockville, Md.; Flextrac Systems, Inc. of Denver, Colo.; Intellectual Property Network of Chicago, Ill.; MAG Systems of Pacifica, Calif.; Master Data Center of Southfield, Mich.; OP Solutions, Inc. of New York, N.Y.; Jamieson & Associates, Inc. of Arlington, Va.; Patrix AB of Goteborg, Sweden; Olcott International & Co. of Weehawken, N.J.; and LegalStar, Inc. of Williamsville, N.Y. (the assignee of this patent). Others have patented docketing software packages (see, e.g., U.S. Pat. No. 5,329,447 (Leedom, Jr.) "High Integrity Computer Implemented Docketing System"; U.S. Pat. No. 5,175,681 (Iwai et al.), "Computerized System for Managing Preparation and Prosecution of Applications in Various Countries for Protection of Industrial Property Rights").

All commercially available IP docketing software products enable users to keep track of actions and due dates associated therewith. Some automatically calculate certain due dates for actions to be taken or annuities, maintenance fees, taxes, or other fees to be paid. Some also are preprogrammed with the laws and rules of multiple countries. All commercially available products provide "docket reports" detailing (usually in chronological order) actions required to be taken by a responsible attorney. Often, these reports are compiled and printed on a periodic basis (e.g., weekly) and distributed to responsible attorneys. In a well-designed system, a docket administrator or managing attorney will also receive a "master" docket report, to monitor all critical due dates.

Although all commercially available computer software docketing programs track actions, due dates and provide reports, they all (except LegalStar's product) suffer one serious disadvantage—they rely on responsible attorneys to read the reports and take appropriate action. If an attorney is away from the office, he or she may not receive a report or take appropriate action. The reports are also sometimes ineffective at communicating critical dates, since statutory bar dates are often commingled with non-critical due dates and reminder dates.

What is needed, then, is a docketing computer program for intellectual property legal matters that automatically scans all critical due dates in a database, compares these dates with some reference date (e.g., the date the scan is done) and displays a graphical, color-coded alert to warn of impending critical due dates.

SUMMARY OF THE INVENTION

The present invention comprises a computerized docketing system for legal matters, comprising a database operatively arranged to store information related to the legal matters, including actions to be taken with respect to the legal matters, and due dates associated with the actions to be taken, an arithmetic logic unit operatively arranged to scan the database, compare each of the due dates with a reference date, and classify the due dates according to proximity of each of the due dates to the reference date, and, means for displaying different classifications of the due dates in different colors for the purpose of alerting a user of the system of matters requiring attention.

A primary object of the invention is to provide a computerized docketing system for legal matters that alerts users to critical deadlines with a color-coded graphical display.

A secondary object of the invention is to provide a computerized docketing system for legal matters that uses the color green to indicate legal matters under control; the color yellow to indicate legal matters requiring attention in the near term; and the color red to indicate legal matters requiring urgent attention.

These and other objects, features and advantages of the present invention will become readily apparent to those having ordinary skill in the art upon a reading of the specification and claims in view of the appended drawings, screen captures and code.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 4 is a screen capture of a representative "File" screen of the invention;

FIG. 5C is a screen capture of a representative "Action" screen of the invention, showing the matter in a "red" state;

FIG. 7 is a screen capture of a representative "Master Docket" report generated by the invention;

DETAILED DESCRIPTION OF THE INVENTION

The present invention is intended to function as an invaluable aid to intellectual property law practitioners in tracking actions and docketing due dates associated with the practice of law. Although all docketing and calendaring computer programs track actions and due dates, and print various reports, the prior art programs rely on the user to read the reports and note critical deadlines. As a result, due dates are most often missed, not because of a computer error, but because a practitioner was inattentive, or was using an outdated docket report. The present invention uniquely uses a color coded graphical display which is continuously updated to alert practitioners to pending and imminent deadlines.

To facilitate a better understanding of the invention, it is helpful to know the following definitions used in the description of the invention:

Practitioner: refers to a patent agent, or an attorney who practices patent, trademark, or copyright law;

Matter: refers to a file or case handled by an intellectual property practitioner;

Action: refers to an action required to be taken in a matter, or an action expected to be taken by a government agency (e.g., by the United States Patent and Trademark Office);

Due date: refers to a date by which some action must be taken;

Statutory bar date: refers to a critical due date, usually prescribed by statute; failure to meet a statutory bar date in an action can result in forfeiture of valuable intellectual property rights, loss of a client for a practitioner, and possible disciplinary action against the practitioner;

Docketing: the act of recording, tracking, displaying and reporting due dates and statutory bar dates associated with actions.

Our description begins with an overview of the program, known commercially as IP LegalDock™, and developed and distributed by LegalStar, Inc. of Williamsville, N.Y., the assignee of this patent.

Figure 1:
FIG. 1 is a screen capture of the main menu of the invention.

Main Menu (FIG. 1)

Upon launch of the program, the user (e.g., a docketing administrator in a law firm) first views the main menu screen shown as a screen capture in FIG. 1. From the main menu, the administrator can select from a number of docketing modules, depending upon the type of matters and actions to be docketed. For example, the administrator can select one of the following modules:

IP LegalDock Trademark (Ex parte) (for docketing trademark applications, renewals, etc.);

IP LegalDock Trademark (Inter partes) (for docketing inter partes trademark matters such as trademark oppositions and cancellation proceedings);

IP LegalDock Patent (for docketing patent related matters, such as patent applications);

IP LegalDock Litigation (for docketing litigation matters);

IP LegalDock General (for docketing general matters);

IP LegalDock Copyright (for docketing copyright registrations and renewals);

IP LegalForm® (a link to an electronic intellectual property law forms program).

From the main menu, the administrator can also access the StarBar, discussed infra, and the System Setup module for setting up various system parameters (e.g., security settings, law firm name, user names, etc.).

Figure 2:
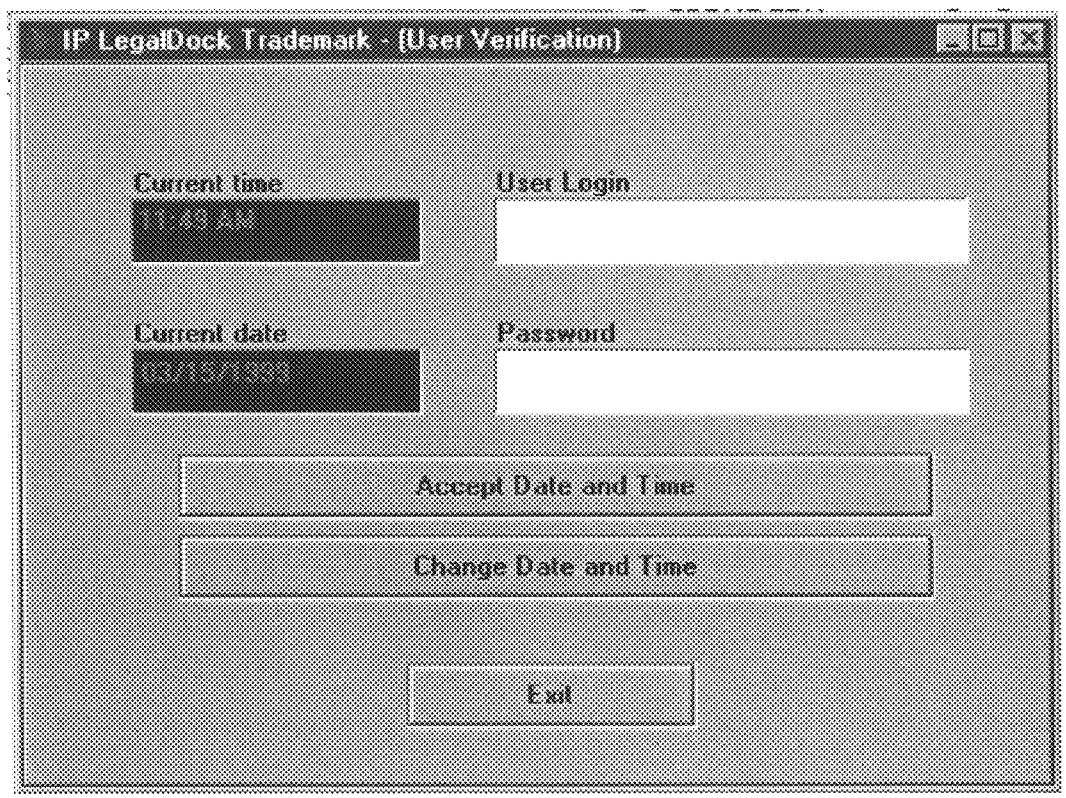
FIG. 2 is a screen capture of the user verification screen of the invention.

Assuming a user selected the IP LegalDock Ex Parte option, the next screen that would appear is the User Verification Screen, shown in FIG. 2.

User Verification Screen (FIG. 2)

For security purposes, only authorized users are allowed to access the docketing program. The System Setup screen (not shown) is used to set user security levels. For example, some users are given full read/write ability, whereas others are given read only ability. In a typical installation, a docketing administrator would be given full read/write authority, while responsible attorneys would be given read only authority. Thus, a docketing administrator could modify due dates and docket actions, but an attorney could only browse docket actions screens without being able to change any due dates, etc. The user verification screen shown in FIG. 2 is used to verify that a person attempting to use the program is authorized to do so.

Figure 3:
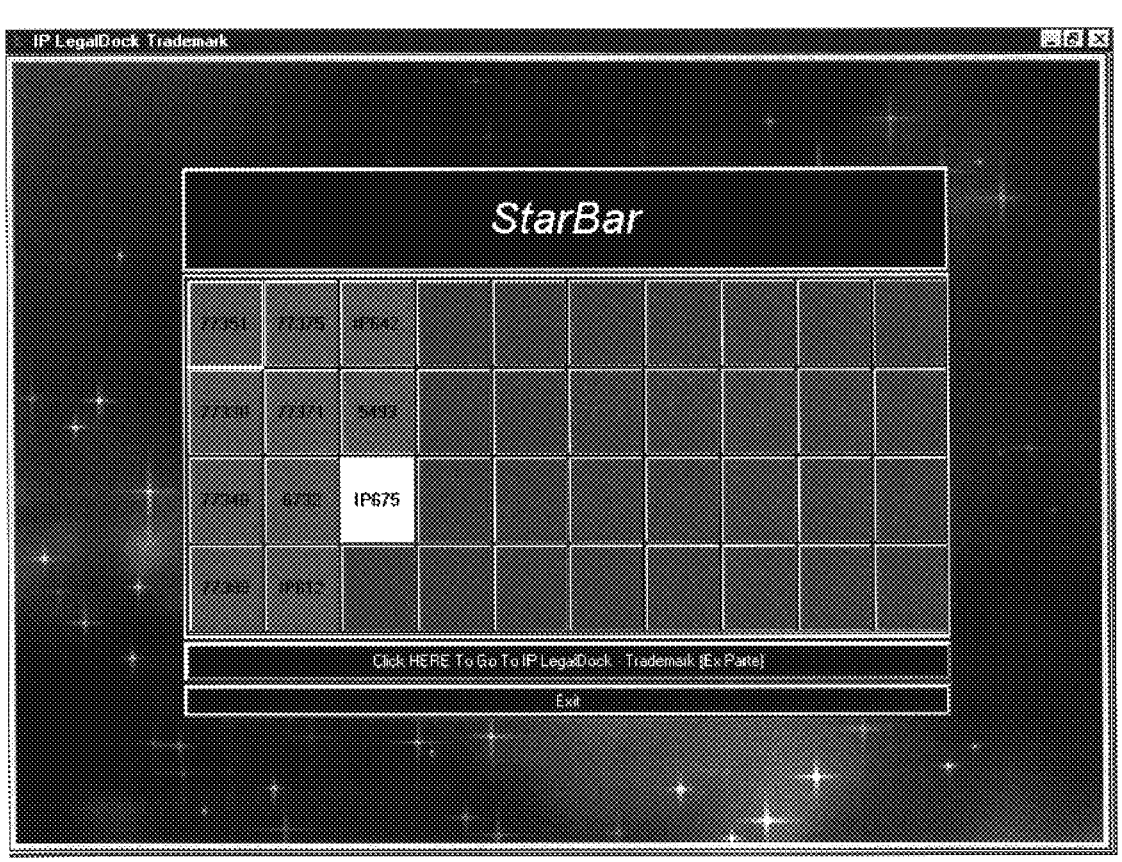
FIG. 3 is a screen capture of the color-coded graphical display of critical due dates of the invention.

Color-coded Graphical Display of Critical Due Dates (StarBar)(FIG. 3)

FIG. 3 is a screen capture of the color-coded graphical display of critical due dates screen. In the commercial embodiment of this invention, this screen is known as the "StarBar". As mentioned previously, all docketing computer programs print docket reports, which are usually distributed to responsible attorneys on a periodic basis. Unfortunately, these reports are only current as of the time they are printed. It is possible that a law firm will assume responsibility for a new case, in between docket report printings, and that the new case will have a critical due date prior to the date of printing of the next docket report. Printed docket reports are very useful, but they require the responsible attorney to pay constant attention to them. Sometimes an attorney will refer to the docket report, notice a matter having a critical due date, work on that matter, and not notice that one or more other matters further down the report are also in need of attention.

The StarBar of the present invention uniquely solves these problems. The StarBar is in the form of a spreadsheet. Each cell in the spreadsheet represents an action docketed by the program. In a preferred embodiment, a red-yellow-green color scheme is used for the cells, although other colors could obviously also be used. The color green is used to indicate the absence of a critical due date in the near future. The color yellow is used to indicate an imminent critical due date. The color red is used to indicate an urgent critical due date. The time periods for "imminent" and "urgent" status may be programmed by the docketing administrator, and may vary from law firm to law firm. For example, some practitioners might want to trigger yellow alarms when a critical due date is within three weeks of the current date, and red alarms when a critical due date is within one week of the current date. More conservative practitioners might use longer time periods.

The StarBar may be accessed either from the Main Menu or from the File or Action screens. Each time the StarBar is accessed, the program scans all critical due dates in the database and compares each of these due dates with a reference date. In a preferred embodiment, the reference date is set to be the date the scan is performed, but the reference date can be any date. If a critical due date is found to be within the "yellow" or "red" alert time range, a cell in the StarBar changes color from green to yellow or red, respectively. The matter number associated with the action triggering the alarm appears in the cell (in a preferred embodiment, the due date also appears in the cell). The user can then click on the cell and the program automatically displays the action screen for the matter triggering the alarm. As an added conveniences, the LegalStar logo on the action screen also turns color (red or yellow), as does the cell in the action screen containing the critical due date triggering the alarm. To remove the alarm, and change the StarBar triggering cell back to green, the docketing administrator must enter a removal date in the column and row associated with the critical due date. In a preferred embodiment, the cells in the StarBar are arranged in descending critical due date order from top to bottom and from left to right, although any order (including random) can be used. As an added precaution, the StarBar screen is always launched when one leaves the Main Menu and attempts to view an Action or File screen. Thus, docketing administrators and attorneys are forced to notice critical due dates whenever using the program.

It should be appreciated that the present invention, in a preferred embodiment, uses a spreadsheet-like display of the color-coded classification of due dates. However, the invention as claimed can obviously take the form of other embodiments. For example, it is envisioned that the computer program can provide a color-coded calendar report as output. This report would be in the form of a conventional calendar having bordered squares as representative of days in a month. The borders of the squares, or the background of the squares can be color-coded to indicate criticality of due dates for particular days. Alternatively, the printing of words on docket reports can be color-coded. For example, statutory bar dates could be printed in red if the due date is within a predetermined time of a reference date. They could be printed in yellow if they fall within a second predetermined time. The display means of the claims, then, are intended to comprise conventional color-computer monitor displays, but also printed color displays (e.g., on paper) as well.

Figure 4:
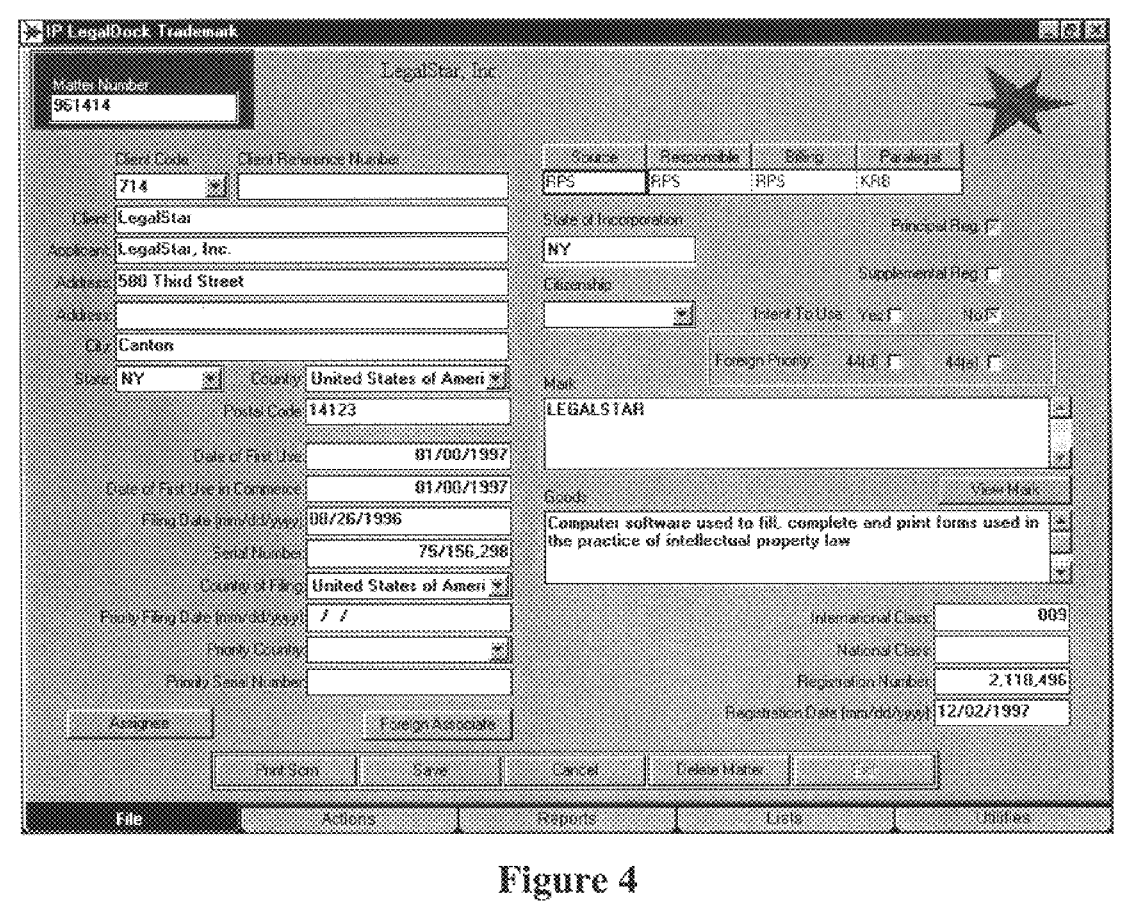

Upon leaving the StarBar screen, a user would next logically enter the File Screen, shown in FIG. 4, to begin docketing a matter.

File Screen (FIG. 4)

The file screen is used to enter and track information and data related to a matter to be docketed. In the representative ex parte trademark screen shown in FIG. 2, the user enters various information such as client name and address, trademark, description of goods, class, country of filing, priority dates, date of first use, etc. The docket administrator can also specify the type of application being filed (e.g., intent-to-use, principal register, etc.) Once this general file information has been entered, the docketing administrator would logically access the Action screen by clicking on the tab at the bottom of the screen.

Figure 5A:
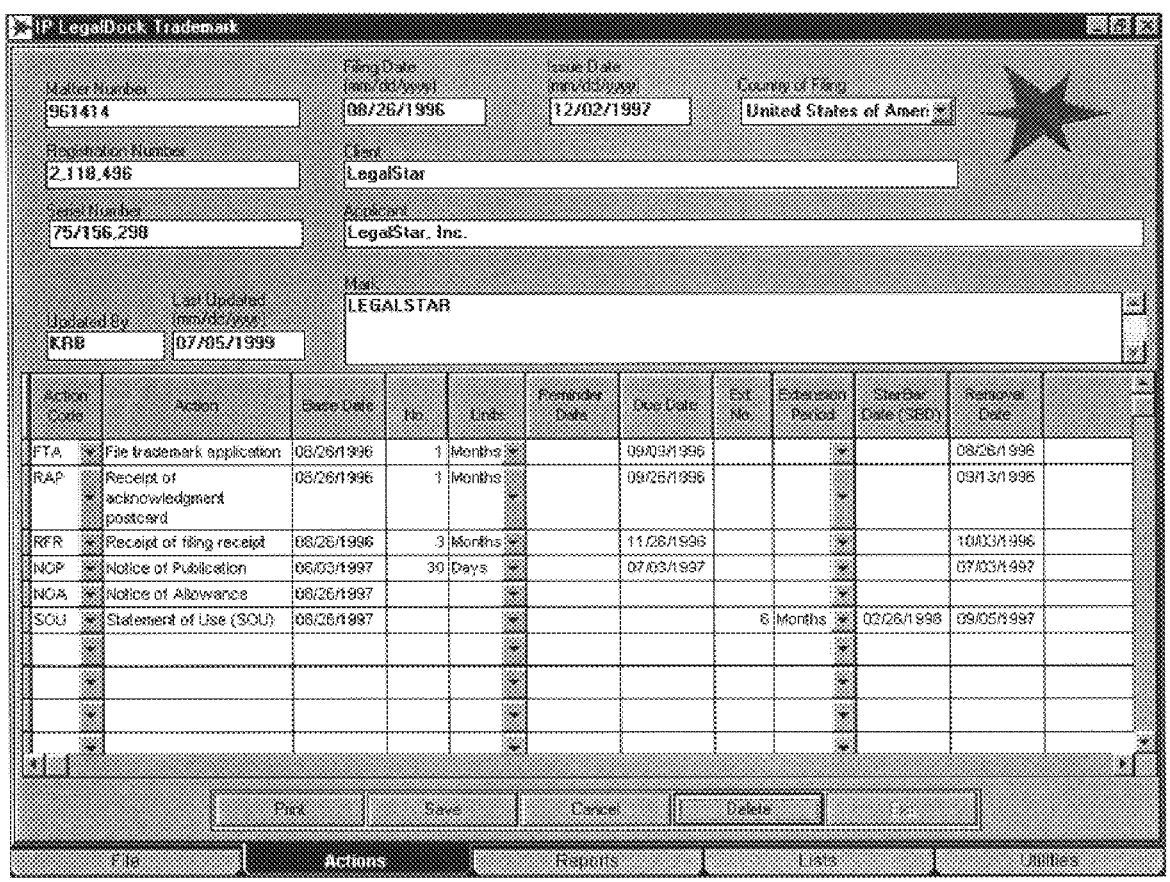
FIG. 5A is a screen capture of a representative "Action" screen of the invention, showing the matter in a "green" state.
Figure 5B:
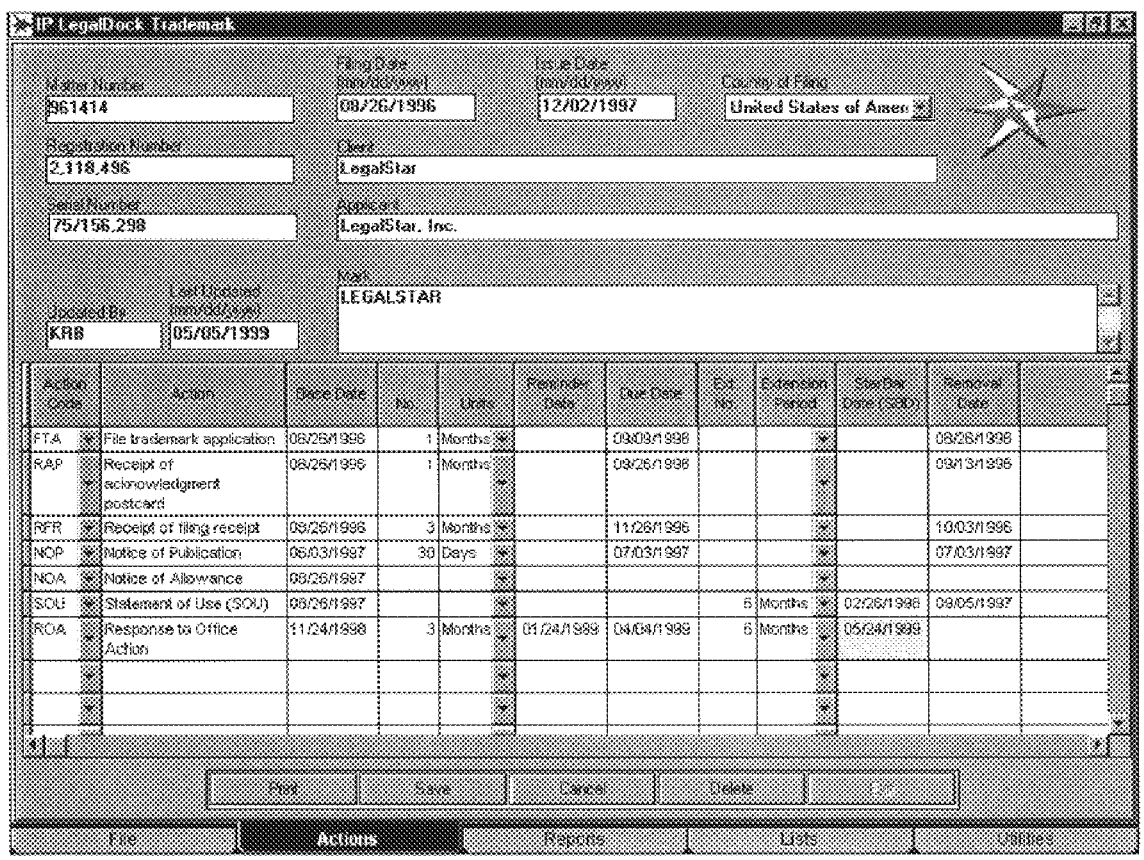
FIG. 5B is a screen capture of a representative "Action" screen of the invention, showing the matter in a "yellow" state.
Figure 5C:
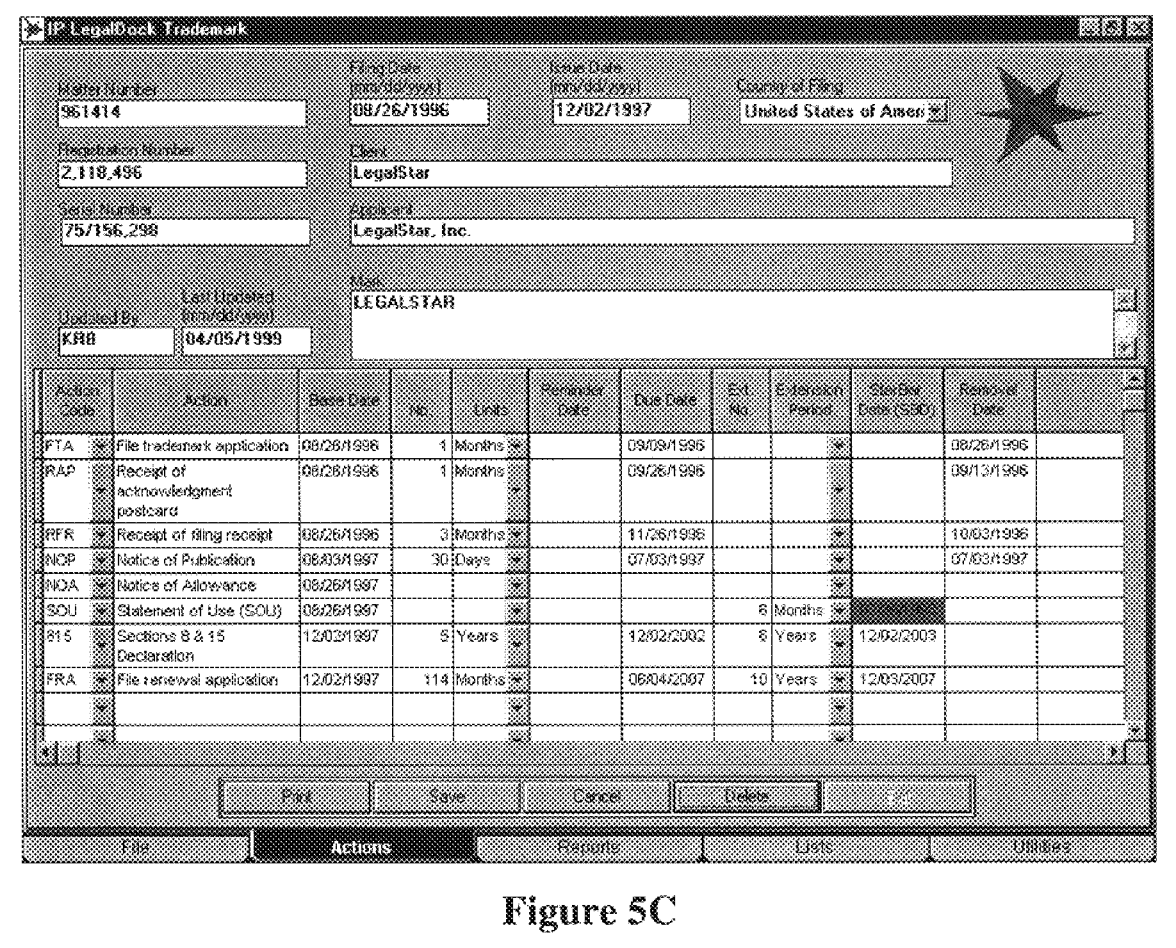

Action Screen (FIG. 5)

The action screen is used to enter and track actions to be docketed. The actions can be either actions required to be taken by a practitioner or expected to be taken by a government agency (e.g., the PTO). As seen in FIG. 5, the action screen calculates and tracks reminder dates, due dates, and statutory bar dates (StarBar dates, SBDs). The program contains a number of predefined actions for each country, and users can also enter their own customized actions as well. Certain due dates are automatically calculated in each country (such as trademark registration renewal dates, for example). When an action is completed, a removal date is entered in the Removal Date column in the row associated with the action completed. As mentioned previously, the LegalStar logo in the upper right of the screen is also color-coded. The star logo is either green, yellow or red, depending on the status of the SBD dates for that particular matter. Also as described previously, although the cells on the action screen are normally configured as black text upon a white background, the background of the cells in the StarBar Date turns yellow or red when a critical date is within a preset trigger time period.

Periodically, a docket administrator would typically use the program to print one or more different types of docket reports. This is done by accessing the Reports screen shown in FIG. 6 and accessed by clicking on the tab at the bottom of the screen.

Figure 6:
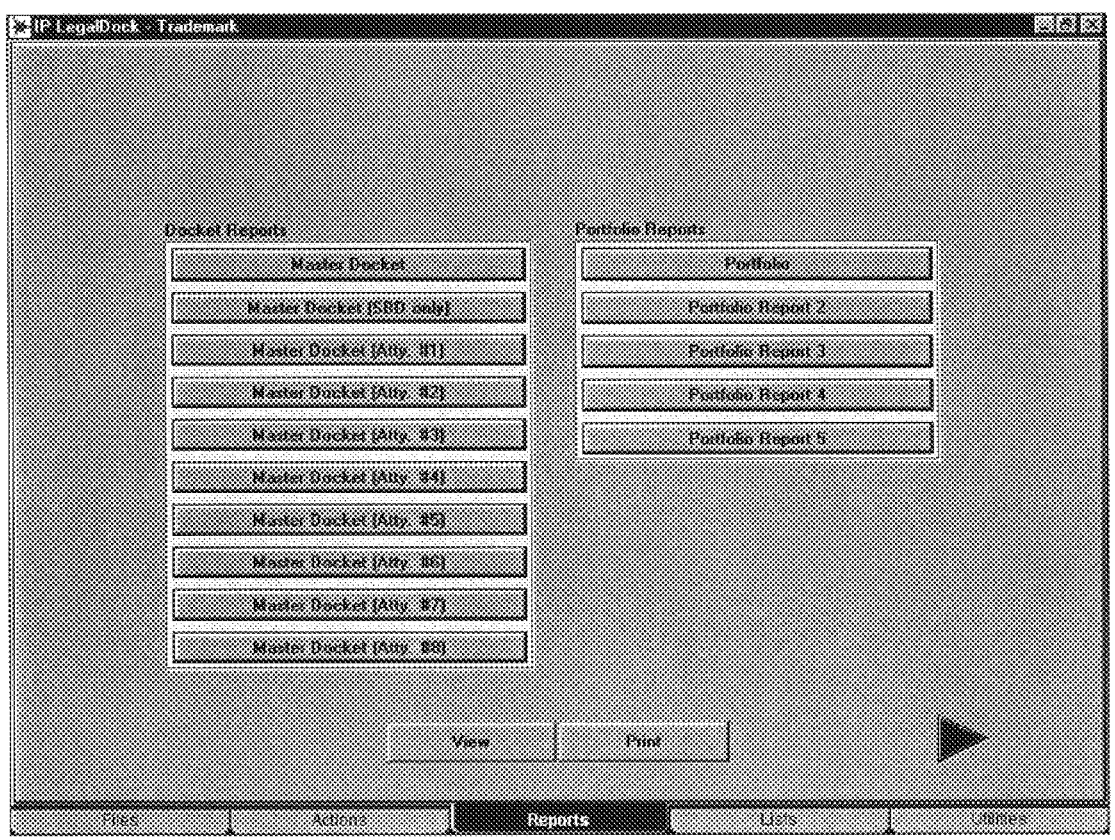
FIG. 6 is a screen capture of the "Report" screen of the invention.

Reports Screen (FIG. 6)

As seen in FIG. 6, a user can print a number of preprogrammed reports or customize a report. For example, one can print a master docket report containing a list of all actions to be taken for all matters within a law firm. Alternatively, one can print a report containing actions required to be taken by a particular practitioner. One can also print out a portfolio report listing all intellectual property owned by a client or company. As an added convenience in helping practitioners to meet their deadlines, most preprogrammed reports print statutory bar dates in bold typeface, normal due dates in italics, and reminder due dates in regular (normal) typeface as shown in FIG. 7.

Figure 8:
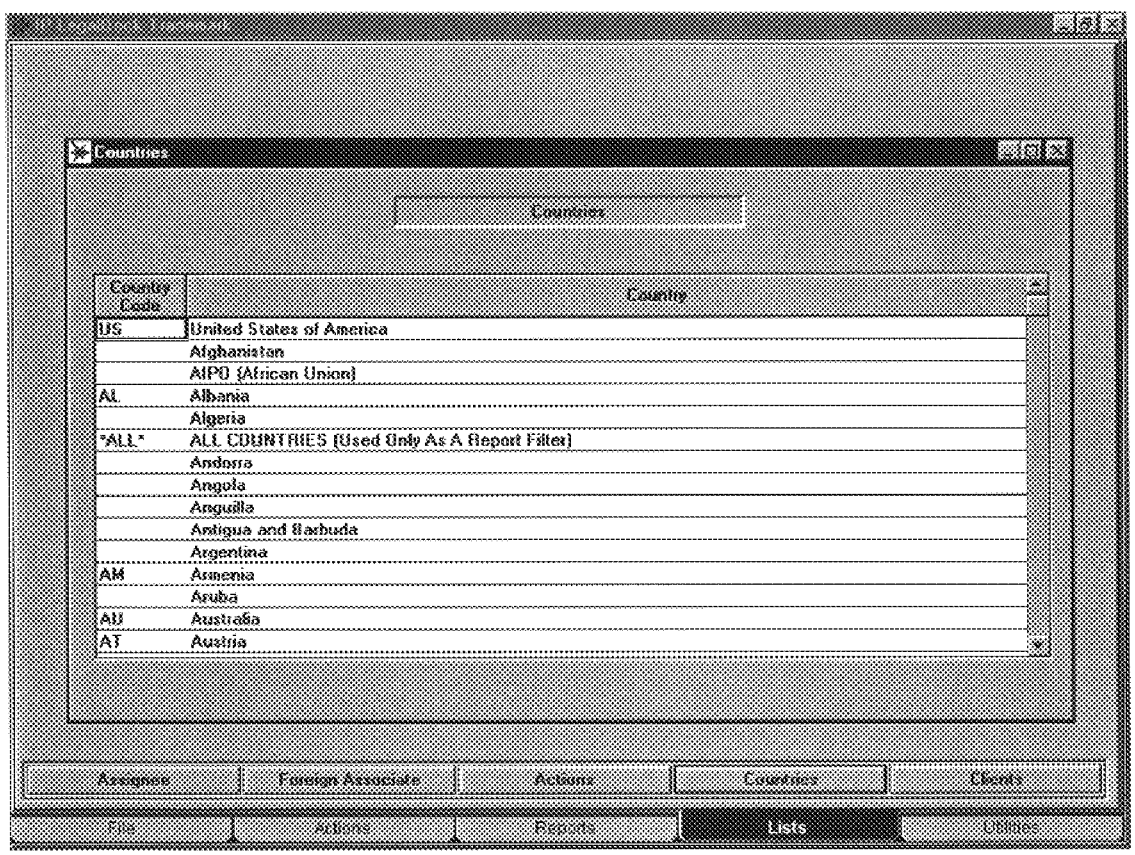
FIG. 8 is a screen capture of the "Lists" screen of the invention, further showing the "Actions" table of the invention.

Lists Screen (FIG. 8)

The program stores various information about foreign law firms, assignees, clients, country information, and actions preprogrammed in various countries. Various "lists" of this information can be accessed by clicking on the "Lists" tab at the bottom of any screen. In FIG. 7, for example, a partial list of actions preprogrammed for the United States is displayed.

Figure 9:
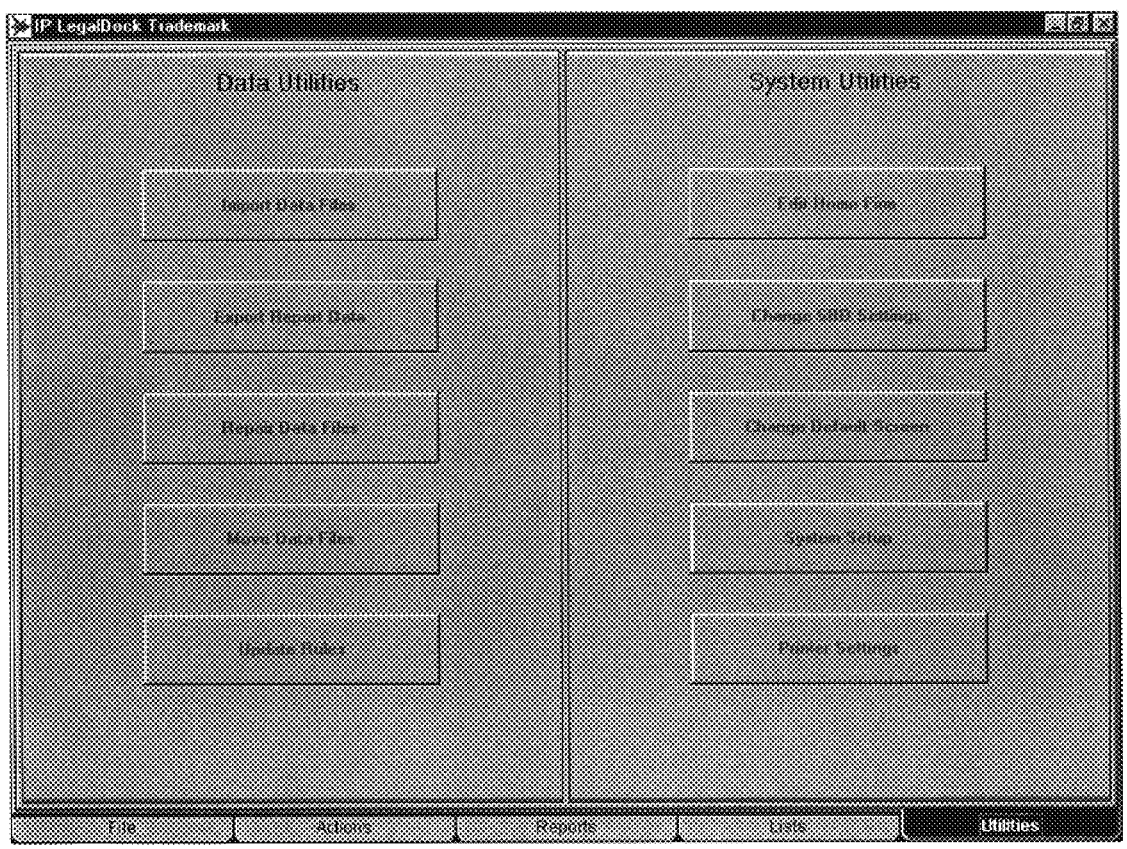
FIG. 9 is a screen capture of the "Utilities" screen of the invention.

Utilities (FIG. 9)

FIG. 9 illustrates a screen capture of the Data Utilities and System Utilities functions of the program. The Data Utilities function enables a user to import or export program data, move or repair data files, or update certain country rules and laws. The System Utilities function is used to set up certain system parameters, such as user security access levels, general firm information, statutory bar date and automatic alert settings, and printer settings. In this utility, for example, one could change the first predetermined time period for a "red" alert, and the second predetermined time period for a "yellow" alert.

Figure 10A:
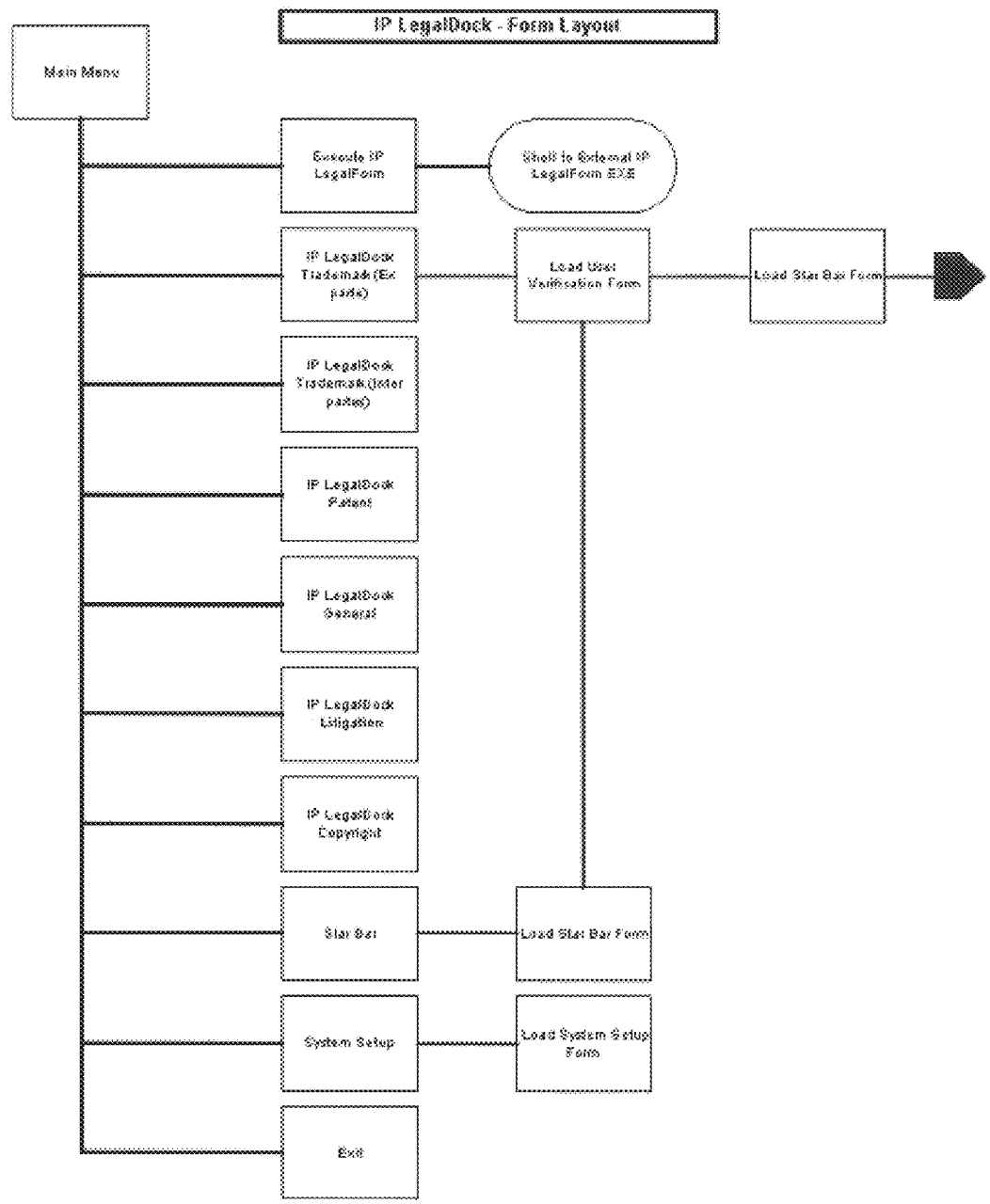
FIGS. 10A, 10B and 10C are segments of a block diagram illustrating the major objects of the invention.
Figure 10B:
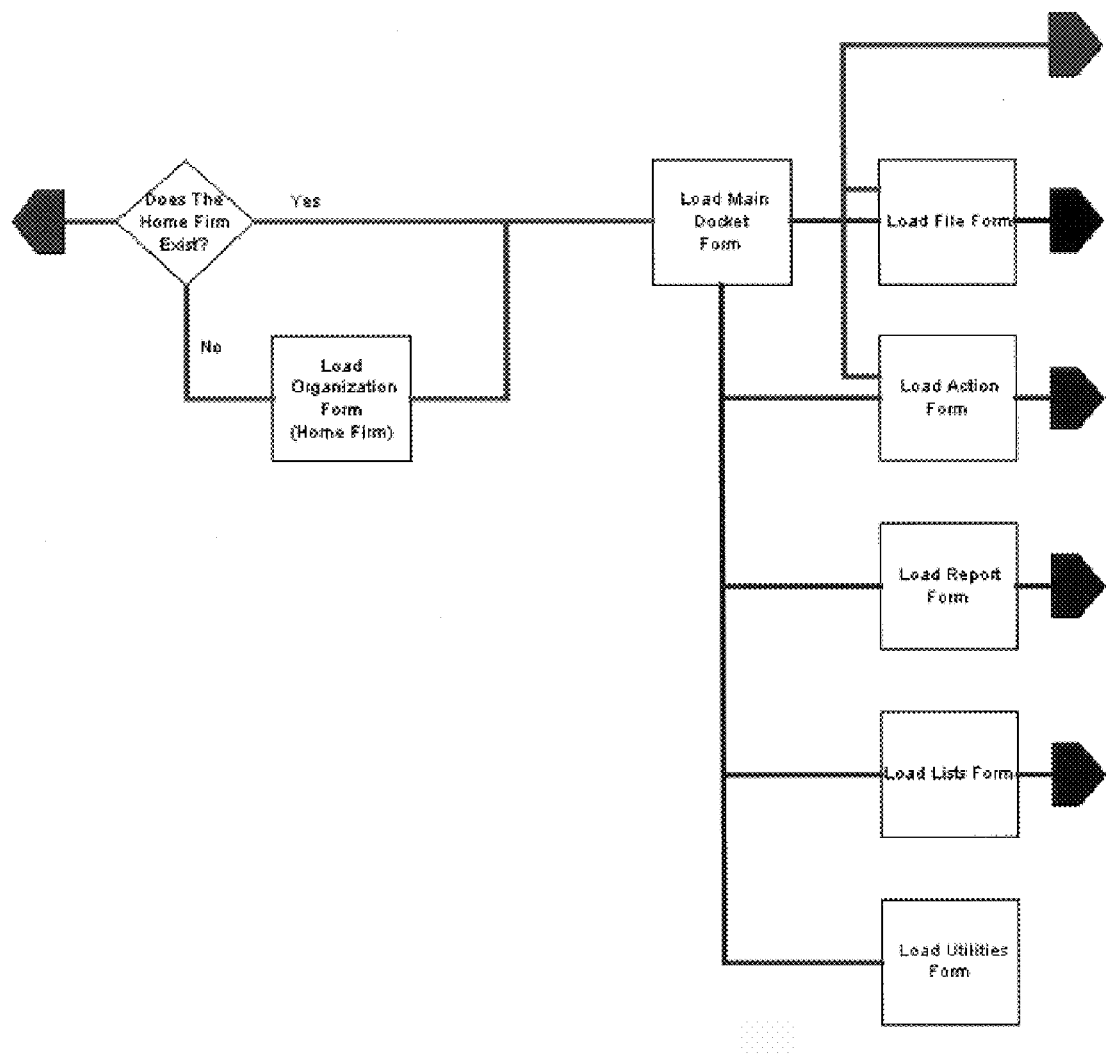
Figure 10C:
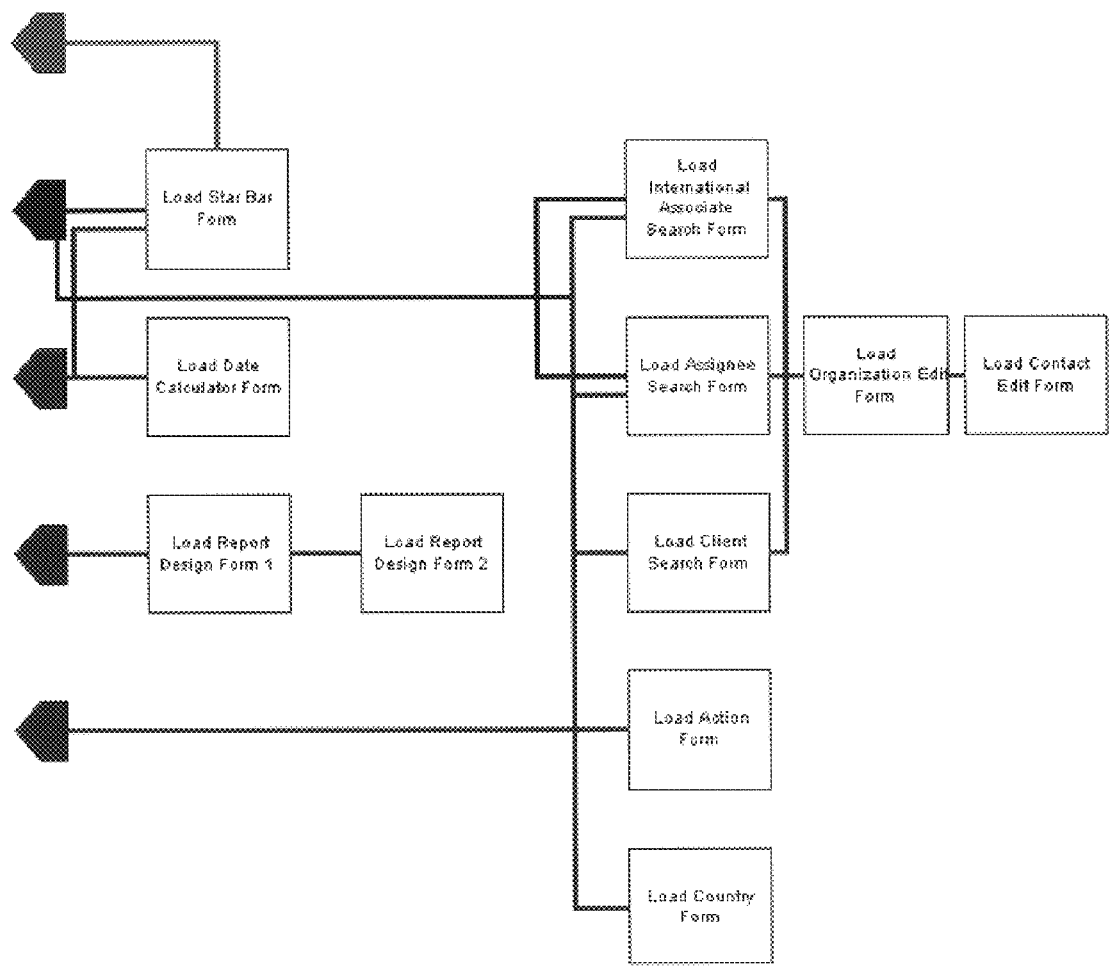

FIGS. 10A, 10B and 10C (Block Diagram)

FIGS. 10A, 10B and 10C comprise a block diagram, indicating the general structure and flow of the main objects of the invention. One having ordinary skill in the art can easily make and use the invention in view of this block diagram in combination with the attached 580 pages of source code. In a preferred embodiment, the arithmetic logic unit comprises source code written in the Visual Basic programming language, and the database was established using the commercially available Microsoft® Access product.

Thus it is seen that the objects of the invention are efficiently obtained. While the present invention has been disclosed in terms of the preferred embodiment in order to facilitate understanding of the invention, it should be appreciated that the invention can be embodied in various forms without departing from the principle or scope of the invention set forth in the appended claims.

What we claim is:

1. A computerized docketing system for legal matters, comprising:

a database operatively arranged to store information related to said legal matters, including actions to be taken with respect to said legal matters, and due dates associated with said actions to be taken;

an arithmetic logic unit operatively arranged to scan said database, compare each of said due dates with a reference date, and classify said due dates according to proximity of each of said due dates to said reference date; and, means for displaying different classifications of said due dates in different colors for the purpose of alerting a user of said system of matters requiring attention.

2. A computerized docketing system for legal matters as recited in claim 1 wherein said reference date corresponds to an actual date when said scan is done.

3. A computerized docketing system for legal matters as recited in claim 1 wherein classifications of due dates within a first predetermined time period relative to said reference date are displayed in red.

4. A computerized docketing system for legal matters as recited in claim 1 wherein classifications of due dates within a second predetermined time period relative to said reference date are displayed in yellow.

5. A computerized docketing system for legal matters as recited in claim 1 wherein classifications of due dates within a third predetermined time period relative to said reference date are displayed in green.

6. A computerized docketing system for legal matters as recited in claim 1 wherein said legal matters are intellectual property legal matters.

7. A computerized docketing system for legal matters as recited in claim 1 wherein said due dates are statutory bar dates.

8. A computerized docketing system for legal matters as recited in claim 1 wherein said means for displaying comprises a computer monitor.

9. A computerized docketing system for legal matters as recited in claim 8 wherein said means for displaying comprises a spreadsheet-type display on said monitor, comprising a plurality of color-coded cells, where each cell is representative of a due date.

10. A computerized docketing system for legal matters as recited in claim 1 wherein said means for displaying comprises a color-coded report printed on paper.

11. The computerized docketing system as recited in claim 1 wherein said arithmetic logic unit is operatively arranged to scan said database, compare each of said due dates with a reference date, and classify said due dates according to proximity of each of said due dates to said reference date upon launch of said system.

12. A computerized docketing method for legal matters, comprising:

storing information related to said legal matters in a database, said information including actions to be taken with respect to said legal matters, and due dates associated with said actions to be taken;

scanning said database, comparing each of said due dates with a reference date, and classifying said due dates according to proximity of each of said due dates to said reference date; and, displaying different classifications of said due dates in different colors for the purpose of alerting a user of said system of matters requiring attention.

* * * * *